Aug. 6, 1968 F. G. LOGAN 3,396,310
STATIC REVERSE POWER RELAY
Filed March 30, 1966 2 Sheets-Sheet 1

INVENTOR.
FRANK G. LOGAN
BY
ATTYS.

United States Patent Office 3,396,310
Patented Aug. 6, 1968

3,396,310
STATIC REVERSE POWER RELAY
Frank G. Logan, Bowie, Md., assignor to the United States of America as represented by the Secretary of the Navy
Filed Mar. 30, 1966, Ser. No. 538,936
5 Claims. (Cl. 317—39)

ABSTRACT OF THE DISCLOSURE

A system for sensing reverse power in an electrical generating system by comparing the phase relationship between the voltage across the generator and the current flowing through the generator. Reverse power in the system causes voltage and current to be 180° out of phase. A solid state phase sensing network generates a signal proportional to this phase relationship. When the output of the phase sensing network exceeds a predetermined amount a mono-stable network is triggered which in turn fires a silicon rectifier which causes a generator to be disconnected from the system.

---

Figure 1:
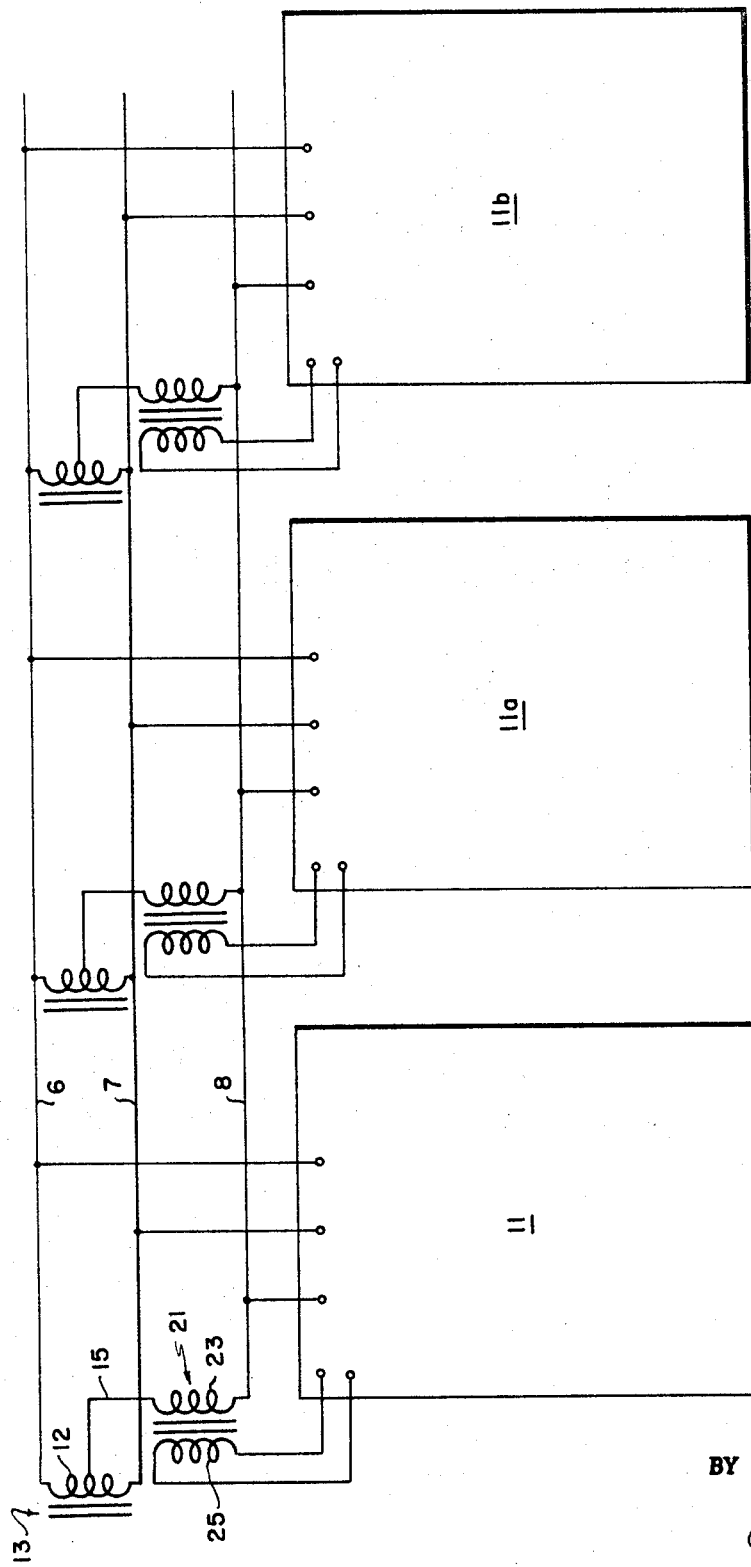

The invention described herein may be manufactured and used by or for the Government of the United States of America for governmental purposes without the payment of any royalties thereon or therefor.

The present invention relates to a protective system for parallelly connected generators and more particularly to reverse power relay system for disconnecting a generator which is driven as a motor.

Very briefly when, two or more, alternating current synchronous generators are driven by separate prime movers and they are connected to a common load bus, then the real power division between the generators is determined by the power delivered to each generator by its prime mover. In the case of turbine driven generators, for example, real power division between machines is accomplished by adjusting the flow of steam to each turbine, either manually or by means of an automatic governor. If for any reason insufficient steam reaches one turbine, its electrical power output will be reduced and the point can be reached, due to the lack of steam where actual power reversal occurs. For example, the generator whose turbine receives insufficient steam will at the reversal point become driven as a motor from the bus requiring the remaining generator or generators to pick up the load previously carried by the steam deficient generator and to carry the steam deficient generator as a motor causing the remaining generator or generators to become severely overloaded.

Generally, the prior art generating systems are provided with means to detect power reversal between generators in order to either notify an operator through an alarm or to remove the malfunctioning set from the bus by activation of a circuit breaker.

The preferred device for determining the reversal of power flow is in essence a disc type wattmeter. The disc is utilized to close contacts when it is rotated in one direction while stops prevent the complete rotation of the disc in the other direction in which the contacts remain open. The direction of rotation of the disc in this type of wattmeter is a function of the direction of power flow, for example, if the power flows from the generator being controlled then the contacts are rotated to the open position and if the power flows into the generator being controlled then the contacts are rotated to the closed condition.

The moving elements of a wattmeter, or the rotating parts of a reverse power relay are extremely sensitive and are not suitable for installations where the instrument is subjected to shock, vibration and moisture. Generally most shipboard installations and even some shore installations are subject to shocks, vibrations, moisture variable inclinations, temperature changes and corrosive atmosphere etc. which cause the sensitive rotatable reverse power relays to fail during operation.

The present invention overcomes the difficulties inherent in the prior art reverse power relays which utilize rotating elements by providing a completely static sensing and control circuit for a reverse power relay which is capable of being built so that it is not effected by environmental conditions found on ships. The present invention provides a phase sensitive network for sensing the phasal relationship between the voltage across the generator and the current flowing through the generator. If the voltage and current are in phase then the output of the phase sensitive network is a minimum value. However, if the voltage and current are 180 out of phase, this signifies that the generator is being driven as a motor and therefore the output of the phase sensitive network is at a maximum value. If the output of the phase sensitive network exceeds a predetermined amount, then it triggers a monostable network, which in turn fires a silicon control rectifier, which in turn activates a circuit breaker to disconnect the generator from the load bus.

An object of the invention is to provide a reliable reverse power relay which will operate in an adverse environment such as the engine room of a vessel.

Another object of the invention is to provide a reverse power relay for a generator of electrical power which will operate in a corrosive atmosphere.

Still another object of the invention is to provide a static reverse power relay which will operate after a predetermined time interval.

A further object of the invention is to provide a static reverse power relay which will be insensitive to normal variations of the electrical generator being protected.

A still further object of the invention is to provide a reverse power relay which utilizes a solid state sensing and control device.

Figure 2:
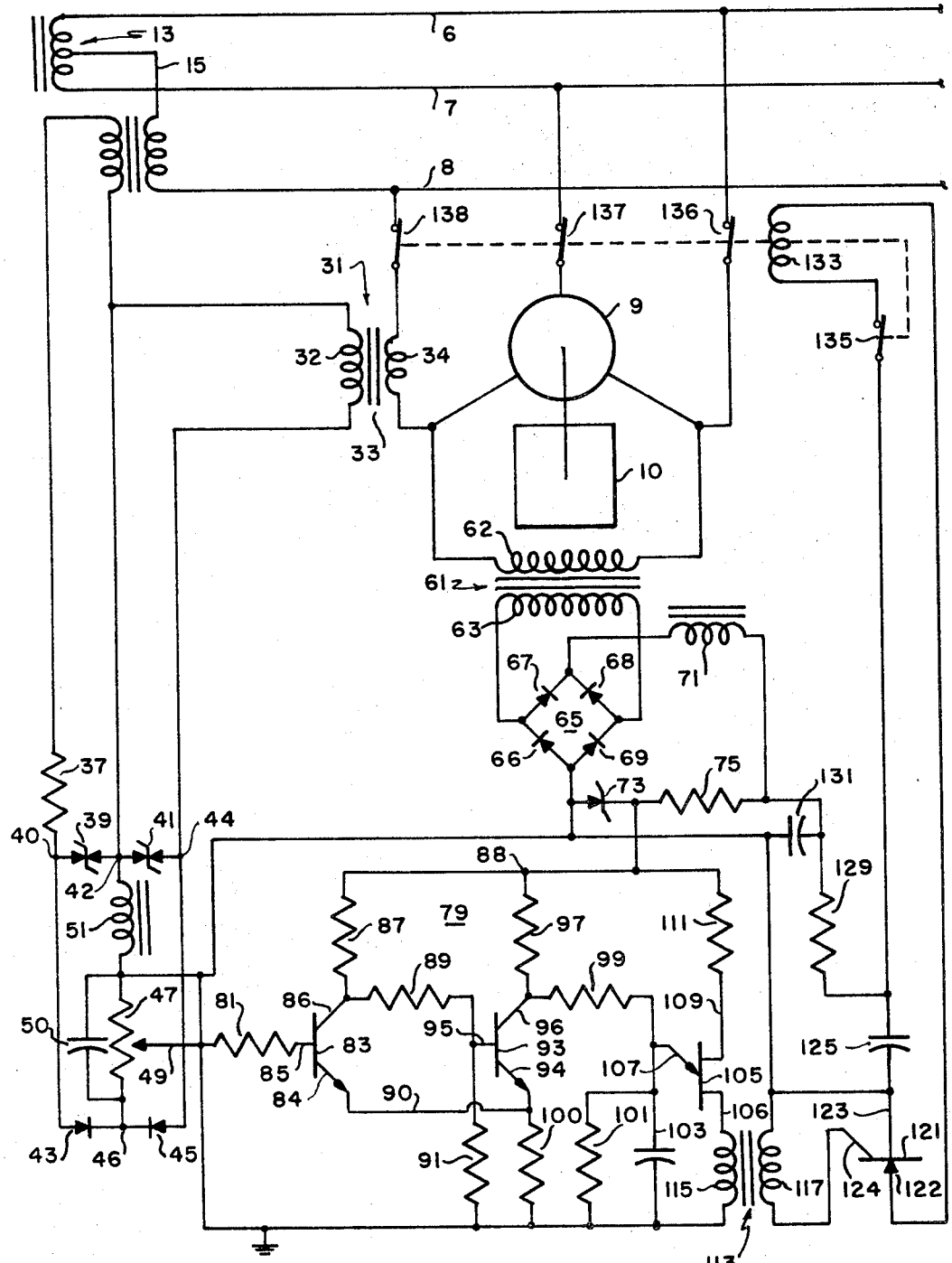

Other objects and many of the attendant advantages of this invention will be readily appreciated as the same becomes better understood by reference to the following detailed description when considered in connection with the accompanying drawings wherein:

FIG. 1 is a block diagram of a paralleled alternating current generator system embodying the invention; and FIG. 2 is a circuit diagram of a reverse power relay control circuit utilized in the present invention.

Referring to FIG. 1 there is illustrated a first box 11 containing a generator and a reverse power relay control system, a second box 11a containing a generator and a reverse power relay control system and a third box 11b containing a generator and a reverse power relay etc. The system illustrated in the box 11 is coupled by a voltage sensitive transformer 21 to the bus lines labeled numbers 6, 7 and 8. The lines 6, 7 and 8 are connected to the generator and carry output power of the generator to the loads. The transformer 21 has a secondary winding 25 connected to the control circuit as will be hereafter described and has one end of its primary winding 23 connected to bus line 8 and its other end of its primary winding connected to the center tap 15 of an auto transformer 13. The auto transformer 13 and the transformer 21 contain cores as shown.

The contents of the box 11 is shown in FIG. 2. The operation and description of FIGS. 1 and 2 will be given concurrently. Transformer secondary winding 25 has one of its ends connected to one end of a resistor 37 and the other end of the transformer winding 25 is connected to the junction point 42 of the back to back Zener diodes 39 and 41. The other end of the resistor 37 is connected to the junction point 40 to which one end of the back to back Zener diode 39 is also connected to. Each one of the Zener diodes 39 and 41 are equivalent to two Zener diodes connected back to back as shown. A diode 43 has its anode connected to the junction 40 and its cathode connected to the junction 46. The cathode of diode 45 is connected to the junction point 46 and the anode of diode 45 is connected to the junction point 44. The secondary winding 32 has one of its ends connected to the junction point 44 and is part of the transformer 31 having a core 33 and a primary winding 34. The other end of the winding 32 is connected to the one end of the secondary winding 32 is connected to the one end of the secondary winding 25 which in turn is connected to the junction point 42. A Zener diode 41 is connected between the respective junction points 42 and 44. A variable potentiometer 47 having one of its ends connected to junction point 46 and its other end connected to one end of choke coil 51. The other end of the choke coil 51 is connected to the junction point 42. A DC filter capacitor 50 is connected across the potentiometer 47. Potentiometer 47 contains a variable tap 49 for picking off an adjustable potential.

The aforementioned structures, the transformers 12 and 21 and diodes 43 and 45, comprise a phase sensing network which senses the condition of the phase relationship between the current generated by the generator 9 and the voltage on the bus lines 6, 7 and 8. A Schmitt trigger 79 is provided which contains a first transistor 83 having an emitter electrode 84, a base electrode 85, and a collector electrode 86 which is of the NPN type. It is, however, to be understood that the transistors and associated semiconductors may be of the opposite conductivity type and the necessary circuit modifications are well known to those skilled in the art of semiconductive circuitry. A resistor 81 has one of its ends connected to the variable tap 49 of the potentiometer 47 and its other end connected to the base electrode 85 of the transistor 83. The collector electrode 86 of the transistor 83 is connected to one end of resistor 87 and the other end of the resistor 87 is connected to the common junction point 88. A second transistor 93 is provided having an emitter electrode 94, a base electrode 95 and a collector electrode 96 which is connected to a resistor 97. The other end of resistor 97 is connected to the junction point 88. The collector electrode 86 of transistor 83 is connected by a resistor 89 to the base electrode 95 of the transistor 93. A bias resistor 91 is connected between the base electrode 95 of the transistor 93 and ground. The emitter electrode 84 of the transistor 83 is connected to the emitter electrode 94 of the transistor 93. A resistor 100 is connected between the emitter electrode 94 of the transistor 93 and ground. The transistors 83 and 93 together form an operating unit known as a Schmitt trigger.

The output of the Schmitt trigger is connected to a unijunction transistor oscillator, the description of which follows. A unijunction transistor 105 has a first drain electrode 106, a junction electrode 107 and a second drain electrode 109. A resistor 99 is connected between the collector electrode 96 of the transistor 93 and the junction electrode 107 of the unijunction transistor 105. A capacitor 103 is connected between the junction electrode 107 of the unijunction transistor 105 and ground. A resistor 101 is connected across the capacitor 103 for bleeding charge off of the capacitor 103. A resistor 111 is connected between the junction point 88 and the second drain electrode 109 of the unijunction transistor 105. The primary winding 115 of a transformer 113 is connected between the first drain electrode 106 of the unijunction transistor 105 and ground.

A transformer 61 is provided with a primary winding 62 which is connected across two of the output leads of the generator 9 for obtaining a voltage for use in operating the Schmitt trigger and reverse power relay. The output of the transformer 61 is taken across the secondary winding 63. One end of the secondary winding 63 is connected to the cathode of diode 66 and the other end of winding 63 is connected to the cathode of diode 69. The voltage rectifying network 65 comprises a first diode 66 having its anode connected to the anode of diode 69. The cathode of diode 66 is connected to the anode of diode 67. The cathode of diode 67 is connected to the cathode of diode 68. The anode of the diode 68 is connected to the cathode of diode 69. The output of the voltage rectifying network 65 is taken from the cathodes of diodes 67 and 68 and the anodes of diodes 66 and 69. A filter choke 71 has one of its ends connected to the cathode of diode 68 and its other end connected to one end of a resistor 75. The other end of the resistor 75 is connected to the cathode of the Zener diode 73. The anode of the Zener diode 73 is connected to the anodes of diodes 66 and 69 which in turn is connected to the ground of the system. The junction point 88 of the Schmitt trigger is connected to the junction of the cathode of the Zener diode 73 and the resistor 75. A smoothing capacitor 131 has one of its ends connected to ground and its other end connected to the junction of choke 71 and resistor 75. A resistor 129 is connected between the junction of the choke coil 71 and the resistor 75 and one terminal of storage capacitor 125. The other terminal of the storage capacitor 125 is connected to the output electrode 123 of a silicon control rectifier 121. The silicon control rectifier 121 is provided with a cathode 123, an anode 122 and a control electrode 124 which is connected to one end of the secondary winding 117 of the transformer 113. The other end of the secondary winding 117 is connected to ground. The cathode 123 of the silicon control rectifier is connected to ground. The control winding 133 of the circuit breaker relay has one of its ends connected to the junction of the charging resistor 129 and the capacitor 125 and its other end connected to the anode 122 of the silicon control rectifier 121.

The circuit breaker relay winding controls four switch elements, the first 135 is in series between the relay winding 133 and the junction resistor 129 and the capacitor 125. The other switches 136, 137 and 138 are between the generator 9 and the common bus lines 6, 7 and 8. When the circuit breaker relay is tripped the switches 135, 136, 137 and 138 are automatically opened thereby protecting the control circuit and the generator.

The operation of FIG. 1 is as follows. Assuming that all three generating and control systems illustrated 11, 11a and 11b are in operation with the respective generators 9, 9a and 9b feeding the bus lines 6, 7 and 8 with electrical power and that all the generators are operating in a satisfactory fashion. Then under the above recited circumstance we will deal, for example, only with the generator and control system 11 with the understanding of all other generators and control systems operate in a similar fashion and are set in the identical fashion as the system 11. When the generator 9 is operating correctly and the control circuit is in operation then the generator 9 will be feeding power into the buses 6, 7 and 8. The voltage across the bus lines 6 and 7 from the auto transformer 13 to the transformer 21. The output across the winding 25 of the transformer 21 and the output of transformer 31 across the secondary winding 32 are in phase when the generator 9 is feeding current, power, into the bus lines 6, 7 and 8. Now it is assumed that the power is being fed under these conditions to the bus line and that therefore the signals sent by the secondary windings 25 and 32 will be of the same phase then the amount of voltage signals sent by the diodes 43 and 45 will be some minimum value. This signal will then be stored on the condenser 50 and picked off of the potentiometer 47 by the tap 49. In general, it is a common occurrence that in a generating system the current and voltage are not always exactly in phase and, therefore the systems are set so that if the current and voltage are not more than 60° apart in phase either leading or lagging an insufficient voltage is developed across the potentiometer 47 to trigger the Schmitt trigger 79. In the event that there is some unwanted transients developed either across the bus line or the generator line the Zener diode 39 and 41 protects the diodes 43 and 45 and associated circuitry from being destroyed. The turns ratio of the primary winding 34 to the secondary winding 32 of the transformer 31 will determine the percentage of the generator full load current at which the relay becomes operative. In order to minimize nuisance tripping, the voltage developed across the secondary winding 32 should be sufficient to cause the relay to operate at something more than 5% of the generator rating and for protection of the apparatus but not more than 10% of the rating. However, the relay operating potentials and the control potentials can be at any desired percentage of the generator rating with the appropriate circuit and transformer designs.

Assuming now that we are still dealing with the case that the generator 9 is sending current to the bus lines then a small amount of current will be sensed and rectified by diodes 43 and 45 and will flow through the potentiometer 47. This small voltage drop across the potentiometer 47 is not sufficient to trigger the Schmitt trigger 79. The potentiometer 49 can be set at varying levels to accommodate the desired phase angle at which the relay is to be tripped e.g. A model of the invention which was constructed and 3.5 volts was chosen as the drop across the potentiometer 47 for triggering the Schmitt trigger 79.

In the aforementioned example the voltage drops across the potentiometer 47 for the following phase angles is 1.5 volts for approximately 30° phase angle difference of the two transformers a 3½ volt signal for a 60° phase difference, a 4.8 volt signal for a 90° phase difference, a 6 volt signal for a 150° phase difference and a 7 volt signal for a 180° phase difference.

For the purpose of explanation the Schmitt trigger is said to operate in the current embodiment at a 3½ volt signal which corresponds to a 60° lead or lag phase angle in operation of the system. The B+ power to operate the system is supplied by the generator 9 through the transformer 61 in the form of an AC power which is then rectified by the bridge rectifier network 65. The output of the bridge rectifier network 65 is filtered by a choke coil 71 and the output is stored on a smoothing capacitor 131. A resistor 75 and Zener diode 73 are connected in series across the smoothing capacitor 131 in order to prevent any surges from developing across the Schmitt trigger and associated unijunction oscillator. Also when the system is operating properly the transistor 83 of the Schmitt trigger is nonconducting and transistor 93 is conducting thereby preventing the unijunction transistor 105 from oscillating. In the event that unijunction transistor does not oscillate there is no output pulse produced on transformer 113 or the control electrode 124 of the silicon control rectifier 121 and therefore the silicon control rectifier 121 cannot fire.

Now assuming that the generator 9 begins to operate as a motor and the phase of the current flowing in the transformer primary winding 34 of transformer 31 reverses and becomes 180° out of phase. The phase detection network of diodes 43 and 45 now detect the 180° phase difference and produce a current flowing through the potentiometer 47 and condenser 50 which tends to build up rapidly to 7 volts. As the voltage builds up past 3½ volts the transistor 83 of the Schmitt trigger 79 becomes conductive thereby triggering the Schmitt trigger to its on condition. The Schmitt trigger is in an on condition when the transistor 83 is conductive and the transistor 93 is nonconductive. When the transistor 93 is nonconductive current flows through resistor 97 and 99 charging the capacitor 103.

The RC time constant determined by resistor 99 and capacitor 103 determines the amount of time delay built into the circuit from the time the Schmitt trigger is triggered to the time the silicon control rectifier will be fired. The aforementioned delay may be anywhere from a few microseconds to a couple of minutes depending on the desired time characteristics. The resistor 101 is provided with discharging the capacitor 103 and the RC time constant of resistor 101 and 103 is greater than the time constant of the capacitor 103 and the charging resistor 99. Therefore, any undesired amount of voltage stored in the condenser 103 due to inadverent triggering of the Schmitt trigger will be discharged by the resistor 101 as will hereinafter become clear. If before the condenser 103 has a chance to charge to a point sufficient to trigger the unijunction transistor 105 to the Schmitt trigger has been cut off then the resistor 101 will bleed and the charge off the condenser 103 thereby discharging the condenser and preventing a false or nuisance triggering of the relay. However if the Schmitt trigger is held on for a period of time greater than the designed delay time as determined by the RC time constance of the resistor 99 and condenser 103 then the condenser 103 will develop a charge sufficiently high to cause the unijunction transistor to trigger thereby producing an output pulse across the primary winding 115 of the transformer 113. This pulse is coupled to the control electrode 124 of the silicon control rectifier 121 by the transformer secondary 117 and causes the silicon control rectifier to fire thereby discharging the condenser 125 through the primary winding of the relay 133. The firing of the silicon control rectifier 121 discharges the stored current of the capacitor causing the circuit breaker relay to actuate thereby opening up the switches 135, 136, 137 and 134. These switches disconnect the generator from the power buses 6, 7 and 8 and also disconnect the relay from the silicon control rectifier 121. In order to place the generator back into service the circuit breaker relay switches 136, 136, 318 and 138 have to close manually, however, it is to be understood that a system may be provided for having the relay switches 135, 136, 177 and 138 automatically closed upon the actuation of a second relay winding for this purpose if this is desirable.

Obviously many modifications and variations of the present invention are possible in the light of the above teachings. It is therefore to be understood that within the scope of the appended claims the invention may be practiced otherwise than as specifically described.

What is claimed is:

1. A reverse power relay control system for disconnecting a source of electrical power from a transmission line comprising:

means for transmitting electric power;

means for supplying electrical power connected to said transmitting means;

means for generating a signal having a variable level which is dependent on the phase relationship between the power supplied by said electrical power supply means and the power flowing on said transmitting means, said means for generating a signal comprising a first transformer means coupled to said transmitting means, said transformer having a secondary winding, a second transformer means coupled to said means for supplying electrical power and said second transformer having a secondary winding, a first end of said secondary winding of said first transformer being connected to a first end of said secondary winding of said second transformer, a first and second diode being connected in a back to back relationship and having a common junction each diode having a free electrode, a potentiometer having a center tap and an inductor connected in series between said common junction of said back to back diodes and said junction of said secondary windings of said first and second transformer, said free end of said first transformer secondary winding being connected to said free electrode of said first diode, and said free end of said second transformer secondary winding being connected to said free electrode of said second diode whereby said generated signal is sampled at said center tap of said potentiometer means responsive to said signal for disconnecting said means for supplying electrical power from said transmitting means.

2. A reverse power relay as defined in claim 1 wherein said means responsive to said signal comprises a Schmitt trigger having an input and an output, said Schmitt trigger input being connected to said center tap of said potentiometer, a unijunction oscillator comprising a delay means having an input and output, said unijunction oscillator input being connected to said Schmitt trigger output, a silicon control rectifier having a control electrode, an anode and a cathode, said control electrode of said silicon control rectifier being coupled to said output of said unijunction transistor oscillator, means for disconnecting said power supply from said power transmission means having a control winding said control winding being connected in series circuit with said silicon control rectifier anode and cathode.

3. A reverse power relay as defined in claim 2 wherein said power supply means comprises a three phase alternating current generator.

4. A reverse power relay as defined in claim 1 wherein said signal responsive means contains a trigger means responsive to a predetermined signal level whereby said means for supplying electrical power can only be disconnected from said transmitting when said signal level is exceeded.

5. A reverse power relay as defined in claim 4 wherein said trigger means is provided with a time delay means, said trigger means having an output, said time delay means being connected to said trigger means output whereby the output of said trigger is delayed by said time delay means.

References Cited
UNITED STATES PATENTS

| | | | |
|---|---|---|---|
| 2,376,766 | 5/1945 | Fountain | 317—43 X |
| 2,986,674 | 5/1961 | Baude | 317—43 |

LEE T. HIX, *Primary Examiner.*

J. D. TRAMMELL, *Assistant Examiner.*